(12) United States Patent
Kraemer

(10) Patent No.: US 7,908,704 B2
(45) Date of Patent: Mar. 22, 2011

(54) WINDSCREEN WIPER SYSTEM

(75) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 811 days.

(21) Appl. No.: 11/813,152

(22) PCT Filed: Nov. 2, 2005

(86) PCT No.: PCT/EP2005/055707
§ 371 (c)(1),
(2), (4) Date: Jun. 29, 2007

(87) PCT Pub. No.: WO2006/072488
PCT Pub. Date: Jul. 13, 2006

(65) Prior Publication Data
US 2008/0201891 A1 Aug. 28, 2008

(30) Foreign Application Priority Data
Dec. 29, 2004 (DE) .................. 10 2004 063 178

(51) Int. Cl.
*B60S 1/34* (2006.01)
(52) U.S. Cl. .................. 15/250.352; 15/250.351
(58) Field of Classification Search .......... 15/250.351, 15/250.352, 250.21, 250.31
See application file for complete search history.

(56) References Cited

U.S. PATENT DOCUMENTS

| | | | | |
|---|---|---|---|---|
| 1,866,375 A | * | 7/1932 | Spinks | 15/250.32 |
| 2,087,178 A | * | 7/1937 | Zaiger | 15/250.351 |
| 2,226,358 A | | 12/1940 | Sibley | |
| 2,353,208 A | | 7/1944 | Whitted | |
| 3,263,261 A | * | 8/1966 | Schulz | 15/257.01 |
| 3,387,316 A | * | 6/1968 | Pearse | 15/250.351 |

FOREIGN PATENT DOCUMENTS

| | | |
|---|---|---|
| FR | 1026098 | 4/1953 |
| GB | 2151465 | 7/1985 |
| WO | 2004/026646 A1 | 4/2004 |
| WO | 2005054018 | 6/2005 |

OTHER PUBLICATIONS

International Search Report for PCT/EP2005/055707.

* cited by examiner

*Primary Examiner* — Gary K Graham
(74) *Attorney, Agent, or Firm* — Michael Best & Friedrich LLP

(57) ABSTRACT

The invention relates to a windscreen wiper system, in particular for a motor vehicle, comprising at least one wiper arm provided with an elastic blade (21) and a fixing element (60). The known wiper arms comprise a tension spring which presses the wiper blade against a pane along with the windscreen wiper operation and maintains said wiper blade in a folded position with respect to the pane when the wiper blade is changed. Said wiper arms require a relatively important number of components and, for this reason, are relatively expensive. The aim of said invention is to make it possible to produce the windscreen wiper system in a more economical manner. For this purpose, the inventive elastic blade (21) is arranged in such a way that it is pivotable about the fixing element (60).

16 Claims, 7 Drawing Sheets

WINDSCREEN WIPER SYSTEM

BACKGROUND OF THE INVENTION

The invention relates to a windshield wiper device, in particular for a motor vehicle, comprising at least one wiper arm provided with an elastic blade and a fixing element.

Wiper arms with a tension spring are known from the prior art, wherein the tension spring presses the wiper arm against the window during wiper operation, and, when the wiper blade is being changed, holds said wiper blade in a position that is swung away from the window. This variation requires a relatively great number of components and an associated relatively high assembly effort so that costs for this variation are high.

In addition, non-articulated wiper arms are also known. These wiper arms have an elastic blade, which is mounted to the fixing element so that it cannot move. In order to swing this wiper arm away from or towards the window, the elastic blade is provided with an initial stress such that starting from a certain distance of the wiper blade from the window, it swings away from or towards the window by itself depending upon whether the wiper blade is being moved away from the window or towards it. The disadvantage of these types of wiper blades, however, is that it is difficult to coordinate the force for the required initial stress of the elastic blade with the force for swinging the wiper blade away. As a result, there is a risk that the wiper arm will expectedly swing away from the window if there is a strong air stream or if the vehicle vibrates, e.g., when driving through potholes.

SUMMARY OF THE INVENTION

The objective of the invention is avoiding the above-mentioned disadvantages known from the prior art in the future.

The invention attains the stated objective with a windshield wiper device of the type cited at the outset, in which, according to the invention, the elastic blade is arranged in such a way that it can pivot around the fixing element. The pressure force of the wiper arm, which results from the initial stress of the elastic blade, can therefore be well coordinated with the force required to swing the wiper blade away from the window. The elastic blade is designed as a leaf spring that can be stressed for bending so that the wiper blade is pressed against the window during wiper operating by the elastic blade. As a result, it is possible to dispense with the tension spring that has been required until now, thereby reducing the number of components in the inventive windshield wiper device and making it more economical as a result.

The leaf spring can be fabricated of a carbon, wherein the material is subsequently hardened and tempered so that the material attains its spring steel properties.

The fixing element can have an articulation so that the wiper arm is able to pivot.

The articulation can be realized very simply and therefore economically with an articulation axis if the articulation is sprayed or cast on the fixing element.

If the elastic blade has a hook that can be suspended in the articulated axis, the wiper arm can be mounted on the articulation with a brief manual manipulation. In addition, the hook makes the wiper arm's swiveling movement around the articulation axis possible.

In another development of the invention the articulated axis can be a rivet pin pressed into the fixing element. This simple design allows the articulation to be manufactured economically.

A spring clip can be provided on the elastic blade. The spring clip locks the wiper arm into the operating position so that a wiper blade attached to the wiper arm is pressed against the window. The spring clip can be designed suitably so that the elastic blade presses the wiper blade against the window with a specific initial stress when the wiper arm is locked in the operating position.

If the spring clip and the elastic blade are embodied to be one piece, assembly steps for connecting the spring clip and elastic blade to each other can be eliminated.

The spring clip can be cut out of the elastic blade. As a result, the material for the elastic blade is being used in an optimal manner. In addition, in this way the spring clip and the elastic blade can be manufactured as one piece, when the spring clip remains connected to the elastic blade on one side.

In addition or as an alternative, the elastic blade can have at least one bow spring.

The at least one bow spring and the elastic blade can be one piece in order to save additional assembly steps.

The free end of the spring clip and/or the bow spring can be bent advantageously. As a result, the free end of the spring clip and/or the bow spring can glide on the fixing element better when the wiper arm pivots.

The spring clip and/or the bow spring can have a crimp. When the wiper arm is in the operating position, the crimp is adjacent to an edge of the fixing element thereby locking the wiper arm into the operating position.

A nub, which engages in an opening arranged on the elastic blade, can be provided on the fixing element. The nub advantageously engages positively in the opening thereby relieving the articulation of the load during wiper operation when the direction of the wiper arm changes so that the articulation does not have to absorb the entire torque required for wiper movement. As a result, the formation over the course of time of an ever increasing play between the articulation and the hook attached to the elastic blade is avoided. This play could result in the wiper blade stopping briefly when the wiper movement reverses or is slanting too much towards the window.

The opening arranged on the elastic blade in which the nub engages can correspond to the cut-out spring clip. As a result, the opening gained by cutting out the spring clip fulfills a useful function.

The fixing element can expediently have a guide groove in which the spring clip can glide on the fixing element.

The fixing element can have a support for the elastic blade. In order to initially stress the elastic blade with the at least one bow spring, it can rest on the support.

In another embodiment, the articulation can have cheeks, which grip laterally around the hooks that can be suspended in the articulation. In this way, the articulation is also relieved of the load so that particularly when the wiper movement changes, it does not have to absorb the entire torque required for wiper movement. As a result, the formation over the course of time of an ever increasing play between the articulation and the hook attached to the elastic blade, which becomes too great due to the predetermined steady load, is avoided.

For the same reason, the hook that can be suspended in the articulation can have an extension on its free end. The extension can then be supported on the cheeks of the articulation thereby ruling out undesired play between the extension and the cheeks.

If the fixing element is an injection molded part it can be manufactured economically in large unit numbers.

In terms of weight and material properties, aluminum, zinc or reinforced plastics are preferred materials for the fixing element.

In alternative embodiment, the fixing element can be manufactured economically in large unit numbers as a sheet metal bent part.

A covering can be attached over the elastic blade for a pleasing design. It is possible to slide or clip the covering on the elastic blade.

So that the elastic blade cannot detach from the articulation in the state where it is swung away from the window, the extension of the hook can be bent around the articulated axis after the hook has been suspended in the articulated axis.

In an alternative embodiment a locking nose can be arranged on the inner side of the covering, and this locking nose can be inserted through an opening in the elastic blade and can engage therewith, whereby the locking nose is adjacent to the articulated axis on its side that faces the wiper blade when the wiper arm is in its operating position. As a result, the locking nose that is inserted through the elastic blade and attached to the articulation axis prevents the elastic blade from being able to detach from the articulation when it is in a state where it is swung away from the window.

In order to be able swing the wiper arm away from the window to change the wiper blade in stable position, the covering and/or the elastic blade can have a bearing surface, which is adjacent to the fixing element when the wiper arm is swung away from the window. In accordance with the embodiment of the bearing surface, the wiper arm can be swung away from the window by more than 90 degrees so that the wiper arm remains in a stable position for changing the wiper blade.

The covering can be manufactured economically in large unit numbers if it is manufactured of plastic.

So that the wiper blade can be replaced conveniently, the elastic blade can have a bearing surface, which is adjacent to the fixing element when the wiper arm is swung away from the window.

BRIEF DESCRIPTION OF THE DRAWINGS

Various exemplary embodiments of the windshield wiper device in accordance with the invention will be explained in greater detail in the following on the basis of the enclosed drawings.

The drawings show in detail.

DETAILED DESCRIPTION

Figure 1:
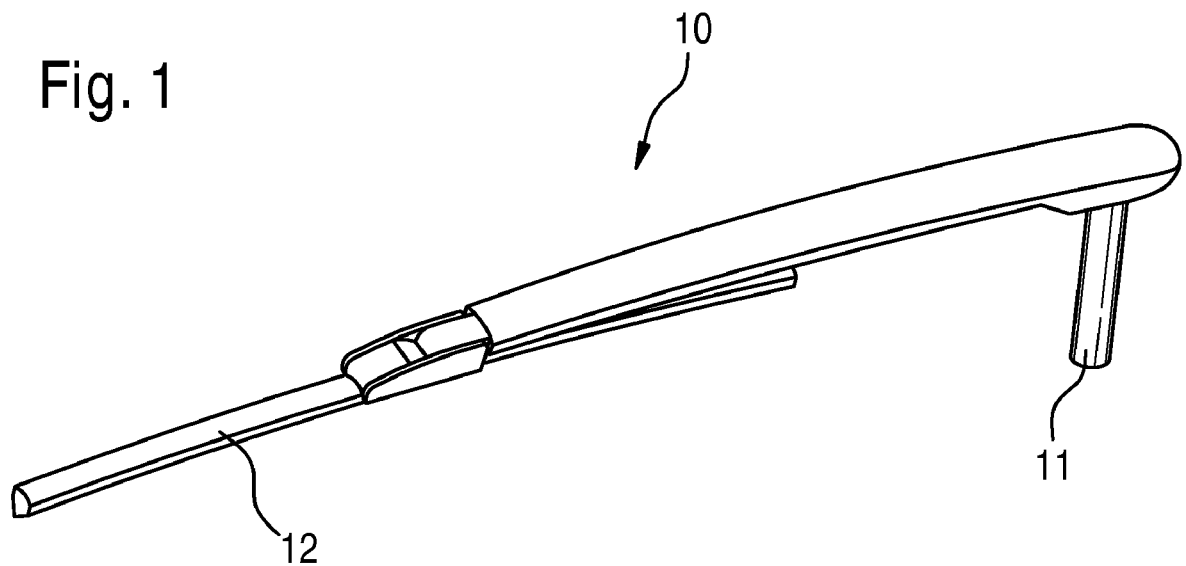
FIG. 1 A perspective top view of a wiper arm with a wiper blade.
Figure 2:
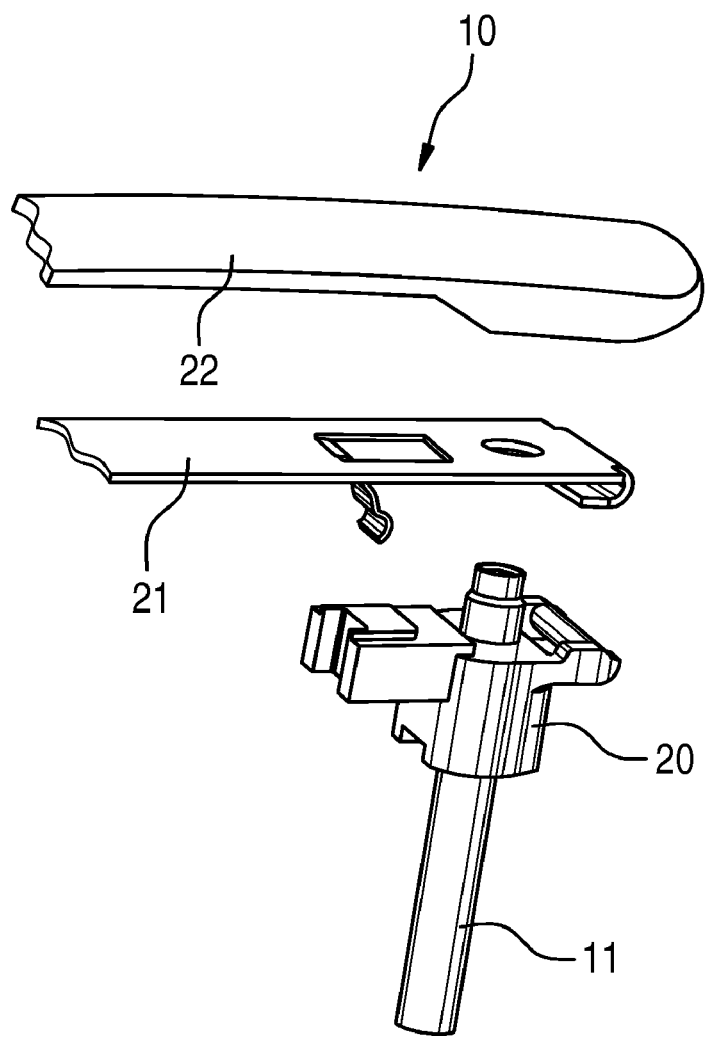
FIG. 2 A perspective exploded representation of the wiper arm from FIG. 1.

FIGS. 1 and 2 show a wiper arm 10, which is mounted on a wiper shaft 11 and provided with a wiper blade 12. A fixing element 20 is situated on the wiper shaft 11. An elastic blade 21 can be fastened on the fixing element 20 so that it can pivot and said elastic blade can be covered with a covering 22.

The elastic blade 21 has a spring clip 30 (see FIG. 3), with which the wiper arm 10 can be locked into an operating position in order to press the wiper blade 12 against a window (not shown here in detail). The spring clip 30 is cut out, preferably punched out of the elastic blade 21 so that the spring clip 30 and the elastic blade 21 can be manufactured as one piece.

Figure 8:
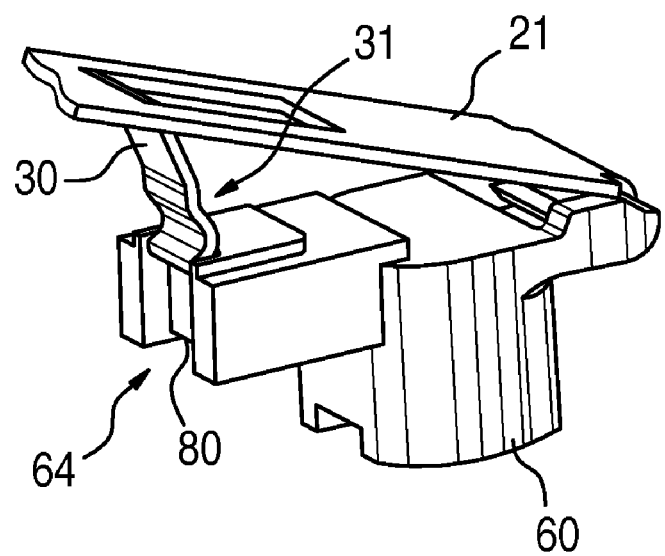
FIG. 8 A perspective top view of a fixing element and the elastic blade at the beginning of a locking process of a spring clip.
Figure 9:
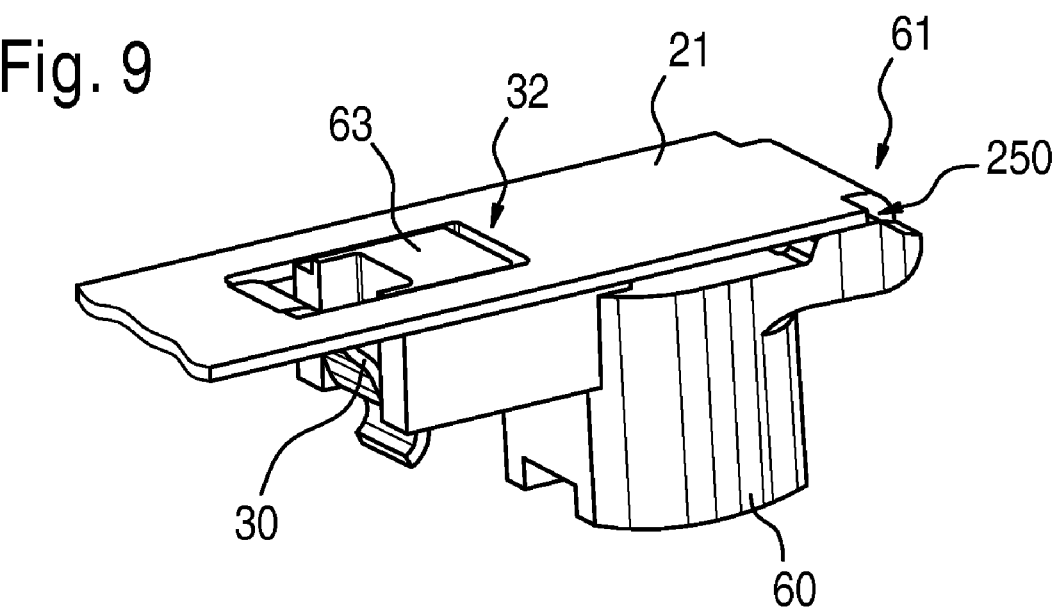
FIG. 9 A perspective top view of the fixing element and the elastic blade at the end of the locking process of the spring clip.

The spring clip 30 is bent on its free end so that it can glide better on the fixing element when the wiper arm 10 pivots (see FIGS. 8 and 9).

The spring clip 30 also features a crimp 31 (see FIG. 3) in order to lock the wiper arm on the fixing element (see FIGS. 8 and 9).

Figure 3:
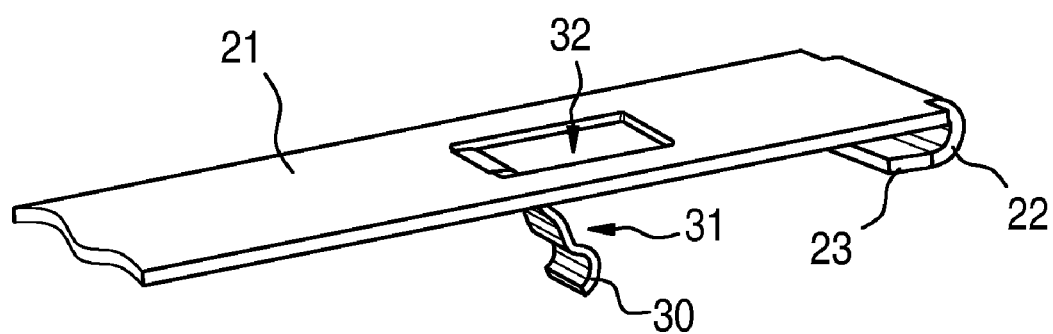
FIG. 3 A perspective view of a first exemplary embodiment of an elastic blade.

In addition, the elastic blade 21 in FIG. 3 features a hook 22 that has an extension 23 on its free end. The hook 22 can be suspended in an articulation on the fixing element 20.

Figure 4:
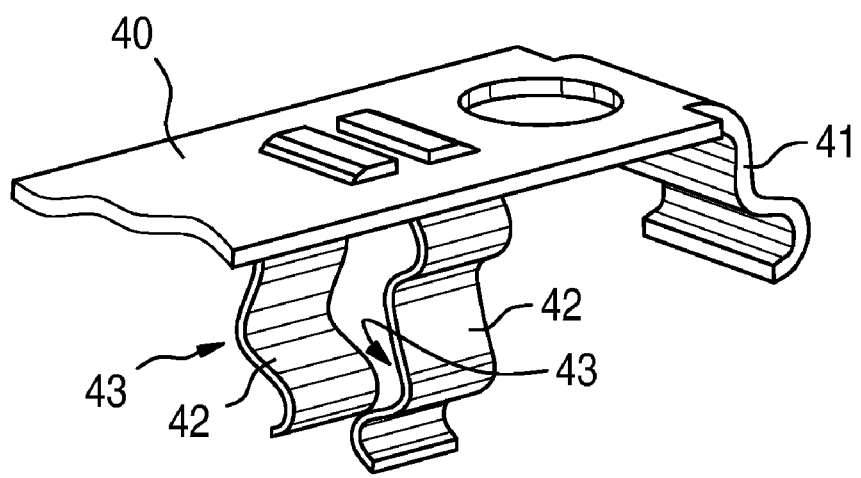
FIG. 4 A perspective view of a second embodiment of the elastic blade.

FIG. 4 depicts an elastic blade 40, which has two bow springs 42 in addition to a hook 41. The bow springs 42 are also used to lock the wiper arm 10 in its operating position so that the elastic blade 40 with its pressure force can transmit the application force to the wiper blade.

In the depicted embodiment, the bow springs 42 and the elastic blade 40 are separate parts, whereby the bow springs 42 can be bent metal parts or fiber reinforced plastic parts.

Figure 5:
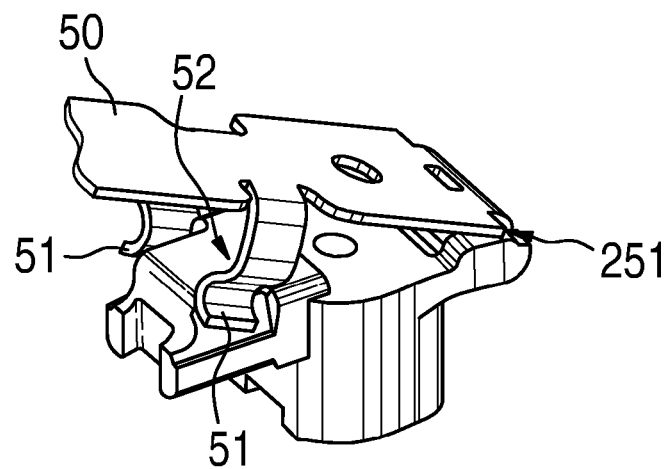
FIG. 5 A perspective view of a first embodiment of a fixing element and a third embodiment of the elastic blade.

FIG. 5, however, shows a possibility according to which an elastic blade 50 and bow springs 51 are manufactured as a single piece in order to save assembly steps.

The free end of the bow springs 42 and 51 is also bent so that it can glide better onto a fixing element 70 (see FIGS. 10 and 11) when it is being clipped on.

The bow springs 42 and 51 also feature a crimp 43 and 52 in order to lock the wiper arm as securely as possible on the fixing element.

Figure 6:
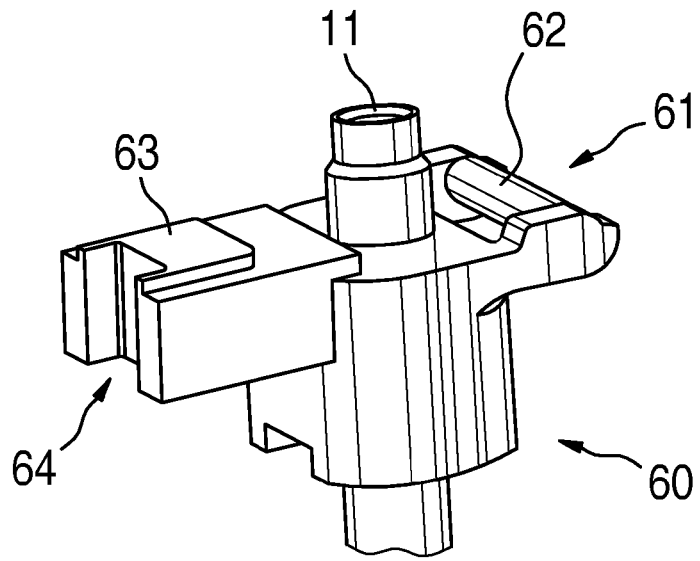
FIG. 6 A perspective top view of a second embodiment of the fixing element.

FIG. 6 depicts a fixing element 60 mounted on the wiper shaft 11. The fixing element 60 is provided with an articulation 61, in which the hook 22 of the elastic blade 21 from FIG. 3 can be suspended. The articulation 61 features an articulated axis 62. The articulated axis 62 can be realized as a rivet pin pressed into the fixing element 60.

In addition, the fixing element 60 has a nub 63, which positively engages in an opening 32 (see FIG. 3) arranged on the elastic blade 21. Because of the positive engagement of the nub 63 in the opening 32, the articulation 61 is relieved of the load during wiper operation, particularly when the wiper arm is changing direction. Consequently, the articulation 61 does not have to absorb the entire torque required for wiper movement. As a result, the formation over the course of time of an ever increasing play between the articulation 61 and the hook 22 (see FIG. 3) is avoided. This play could result in the wiper blade stopping briefly during wiper movement at the reversing point or slanting too much towards the window.

The fixing element 60 also has a guide groove 64 into which the spring clip 30 (see FIG. 3) is guided when gliding on the fixing element 60 (see FIG. 8).

The fixing element 60 depicted in FIG. 6 can preferably be an injection molded part, which can be manufactured of aluminum, zinc or a reinforced plastic.

Figure 7:
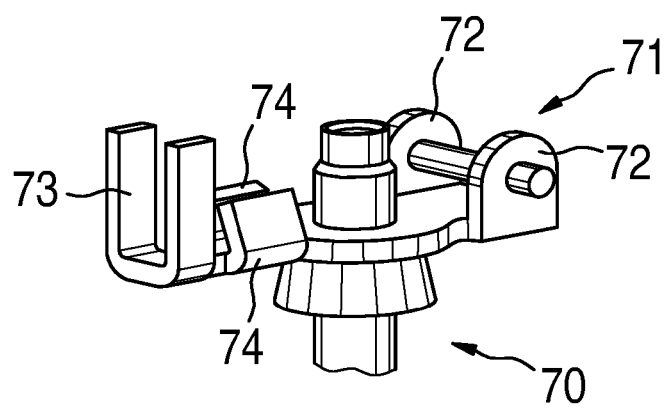
FIG. 7 A perspective top view of a third embodiment of the fixing element.

FIG. 7 depicts a fixing element 70 having an articulation 71 that is provided with cheeks 72. The cheeks 72 grip around the hook 41 (see FIGS. 10 and 11) when the elastic blade 40 with its hook 41 (see FIG. 4) is suspended in the fixing element 70. The articulation 71 is relieved of the load in this manner so that its does not have to absorb the entire torque required for wiper movement. As a result, this prevents an ever increasing play between the articulation 71 and the hook 22, which becomes too great due to the continuous load.

The fixing element 70 features a support 73 (see FIG. 7), on which the elastic blade 40 can rest (see FIG. 1). When the bow springs 42 engage on the locking element 74 (see FIGS. 7 and 11), the elastic blade 40 rests on the support 73. The elastic blade 40 is initially stressed in the area of a wiper blade suspension and can transmit the force of the initial stress to the wiper blade.

The fixing element 70 depicted in FIG. 7 can preferably be a sheet metal bent part.

FIGS. 8 and 9 illustrate the process of engaging the elastic blade 21 with the fixing element 60. In this case, the elastic blade 21 is swiveled downward against the window, whereby the spring clip 30 glides downward along the groove 64 with its free bent end. When the elastic blade 21 comes to rest on the fixing element 60, the clip 30 engages with its crimp 31 on an edge 80 on the end of the groove 64 thereby locking the elastic blade 21 into its operating position and at the same time initially stressing it (see FIG. 9).

In this operating position (see FIG. 9), the nub 63 positively engages in the opening 32, thereby relieving the articulation 61 of the load during wiper movement.

Figure 10:
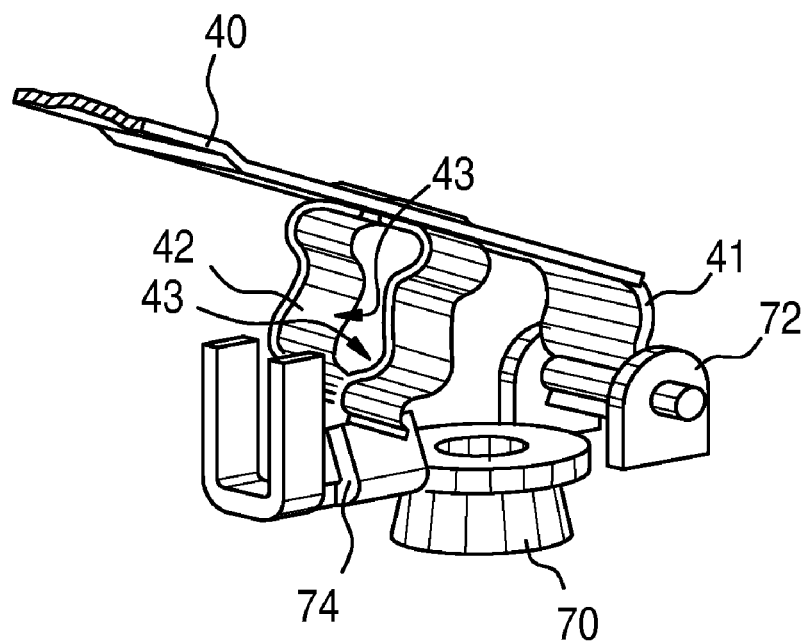
FIG. 10 A perspective top view of the fixing element and the elastic blade at the beginning of a locking process of two bow springs.
Figure 11:
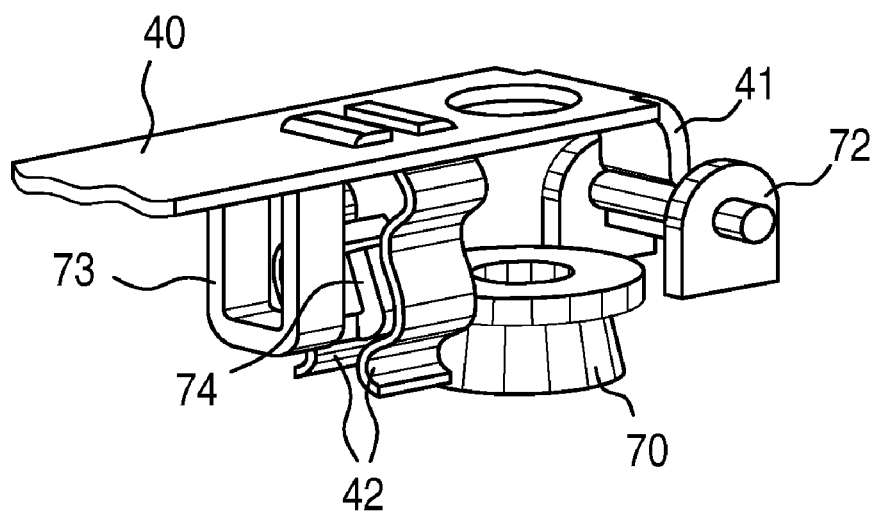
FIG. 11 A perspective top view of the fixing element and the elastic blade at the end of the locking process of the two bow springs.

FIGS. 10 and 11 depict the process of engaging the elastic blade 40 on the fixing element 70. In this case as well, the elastic blade 40 is swiveled downward against the window, whereby the bow springs 42 glide downward over the locking elements 74 with their free bent end. When the elastic blade 40 comes to rest on the support 73, the bow springs 42 engage with their crimps 43 on the locking elements 74. As a result, the elastic blade 40 is locked into its operating position and also initially stressed (see FIG. 11).

Figure 12:
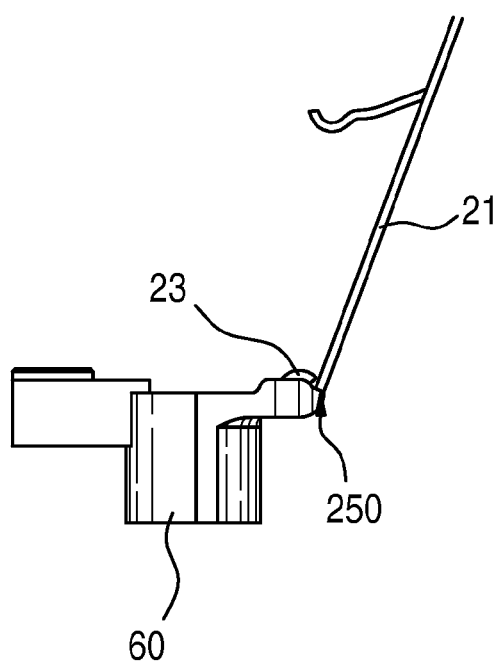
FIG. 12 A side view of the swung-away elastic blade with a bent hook.

FIG. 12 depicts the elastic blade 21 (also see FIG. 3) where the extension 23 of the hook 22 is bent around the articulated axis (not shown here). As a result, the elastic blade 21 cannot detach from the articulated axis when the wiper arm is swung away from the window.

In addition, FIG. 12 shows the elastic blade 21 in a state where it is swung away from the window. The elastic blade 21 has a bearing surface 250 (also see FIG. 9) resting on the fixing element 60. The wiper blade can be replaced in a state where it is swung away from the window.

Figure 13:
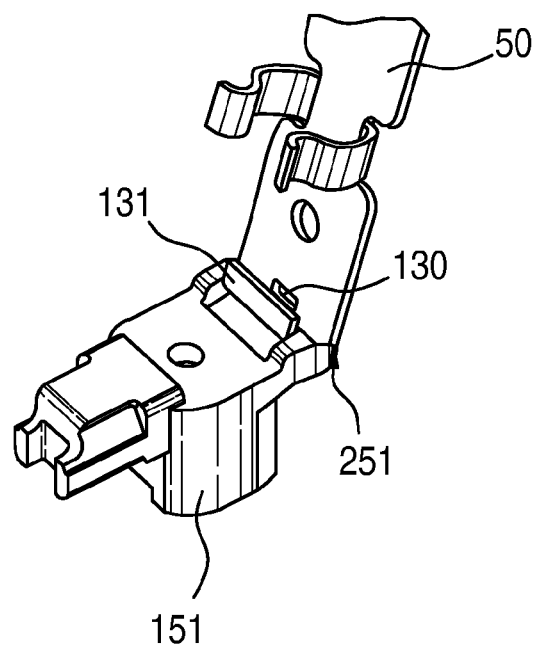
FIG. 13 A perspective view of a swung-away elastic blade with a hook that has not been bent.
Figure 14:
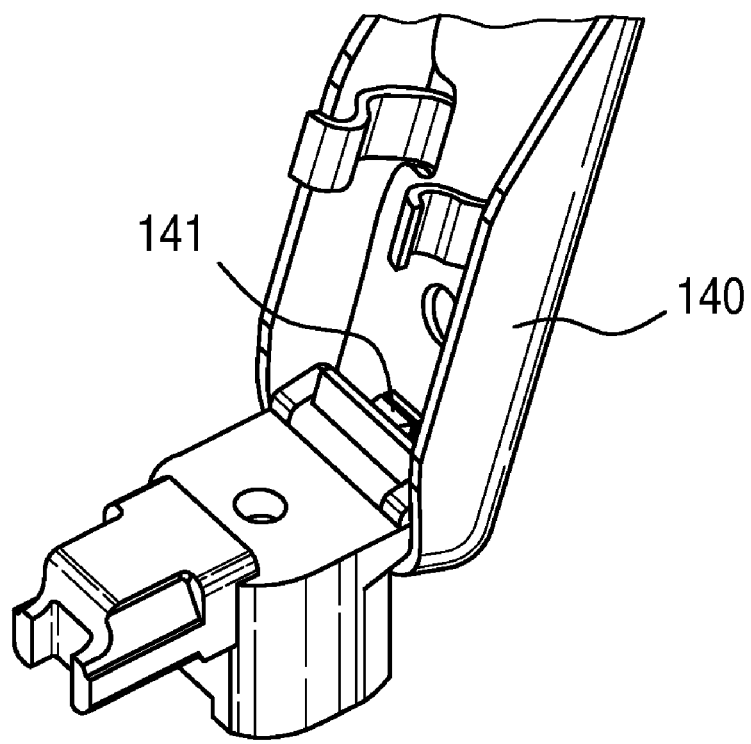
FIG. 14 A perspective view of the elastic blade from FIG. 13 with a mounted Covering.

FIG. 13 depicts the elastic blade 50 from FIG. 5, which has an opening 130 through which a locking noise 141 (see FIG. 14) attached to the covering 140 can be inserted. Because of the locking nose 141, the covering 140 can be fastened to the elastic blade 50. In addition, the locking nose 141 prevents the elastic blade 50 from being detached from the articulated axis (also not shown here) in a state where it is swung away from the window. As a result, an extension 131 of the hook that can be suspended in the articulated axis does not have to be bent.

FIG. 13 shows the elastic blade 50 in a state where it is swung away from the window. The elastic blade 50 features a bearing surface 251 (also see FIG. 5) resting on a fixing element 151. The wiper blade can be replaced in a state where it is swung away from the window.

Figure 15:
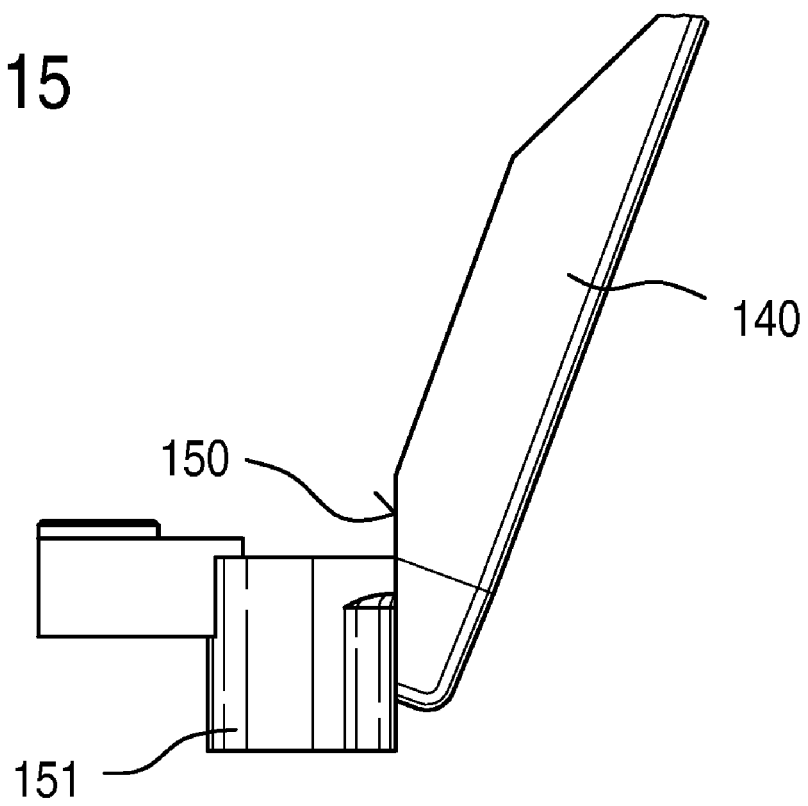
FIG. 15 A side view of the covering with a wiper arm that has been swung away from the window.

FIG. 15 depicts the covering 140 in a state where it is swung away from the window. The covering 140 has a slanted bearing surface 150 adjacent to a fixing element 151. The wiper arm can be swung away from the window by more than 90 degrees because of the slanted bearing surface 150. The wiper arm remains in this position by itself so that the wiper blade can be replaced.

The invention claimed is:

1. Windshield wiper device comprising at least one wiper arm (10) provided with an elastic blade (21) and a fixing element (20, 60), characterized in that the elastic blade (21) is arranged such that it can pivot around the fixing element (20, 60), wherein a spring clip (30) is cut out of the elastic blade (21), and a nub (63) is provided on the fixing element (60), which nub engages in an opening (32) through the elastic blade (21), the opening (32) corresponding to the cut-out spring clip (30).

2. Windshield wiper device according to claim 1, characterized in that the fixing element (20, 60) has an articulation (61).

3. Windshield wiper device according to claim 2, characterized in that the articulation (61) has an articulated axis (62).

4. Windshield wiper device according to claim 3, characterized in that the elastic blade (21) has a hook (22) that can be suspended on the articulated axis (62).

5. Windshield wiper device according to claim 4, characterized in that the hook (22) that can be suspended on the articulated axis (62) has an extension (23) on its free end.

6. Windshield wiper device according to claim 5, characterized in that the extension (23) can be bent around the articulated axis (62) after the hook (22) has been suspended on the articulated axis (62).

7. Windshield wiper device according to claim 3, characterized in that the articulated axis (62) is a rivet pin pressed into the fixing element (20, 60).

8. Windshield wiper device according to claim 1, characterized in that the free end of the spring clip (30) is bent.

9. Windshield wiper device according to claim 1, characterized in that the spring clip (30) has a crimp (31).

10. Windshield wiper device according to claim 1, characterized in that the fixing element (60) has a guide groove (64) for guiding the spring clip (30).

11. Windshield wiper device according to claim 1, characterized in that the fixing element (60) is an injection molded part.

12. Windshield wiper device according to claim 11, characterized in that the fixing element (60) can be manufactured of aluminum, zinc or a reinforced plastic.

13. Windshield wiper device according to claim 1, characterized in that a covering (140) can be attached over the elastic blade (21).

14. Windshield wiper device according to claim 13, characterized in that the covering (140) has a bearing surface (150), which is adjacent to the fixing element when the wiper arm is swung away from the window.

15. Windshield wiper device according to claim 13, characterized in that the covering (140) is fabricated of plastic.

16. Windshield wiper device according to claim 15, characterized in that the elastic blade (21) has a bearing surface (250), which is adjacent to the fixing element (60) when the wiper arm is swung away from the window.

* * * * *